United States Patent

[11] 3,584,918

[72] Inventors Alfonso T. Gaglione
 Solon;
 Larry L. Snyder, Macedonia; Louis L. Lipnos, Maple Heights, all of, Ohio
[21] Appl. No. 864,325
[22] Filed Oct. 7, 1969
[45] Patented June 15, 1971
[73] Assignee Jarva, Inc.
 Solon, Ohio

[54] ARTICULATED TORQUE ARM CONSTRUCTION
 12 Claims, 7 Drawing Figs.
[52] U.S. Cl. .................................................. 299/31,
 64/3, 74/606, 173/35
[51] Int. Cl. ..................................................... E01g 3/04
[50] Field of Search ........................................... 299/31;
 173/35; 64/3, 32; 74/606

[56] References Cited
 UNITED STATES PATENTS
 3,383,138  5/1968  Scaravilli et al. .............  299/31

Primary Examiner—Ernest R. Purser
Attorney—McNenny, Farrington, Pearne and Gordon ABSTRACT: A tunneling machine is disclosed having a support frame and a movable frame carried on the support frame by articulated torque arm units. Each unit includes two torque arms pivotally connected together at a central pivot point. Each arm includes a U-shaped yoke member, and the end portions of one of the yoke members are pivotally connected to the movable frame at body pivot points while the end portions of the other are pivotally connected to the support frame at body pivot points. A reinforcing member and a prestressing rod cooperate to prevent separation of the end portions of each yoke member to prevent separating and slamming together of their thrust bearing contact surfaces under severe loading conditions. Self-aligning ball bushings are provided at each body pivot point and at the central pivot point to insure perfect thrust bearing contact surface alignment even if the unit is deflected by severe shock loading.

PATENTED JUN 15 1971

INVENTORS
ALFONSO T. GAGLIONE,
LARRY L. SNYDER,
& LOUIS L. LIPNOS
BY
McNENNY, FARRINGTON, PEARNE & GORDON

ATTORNEYS

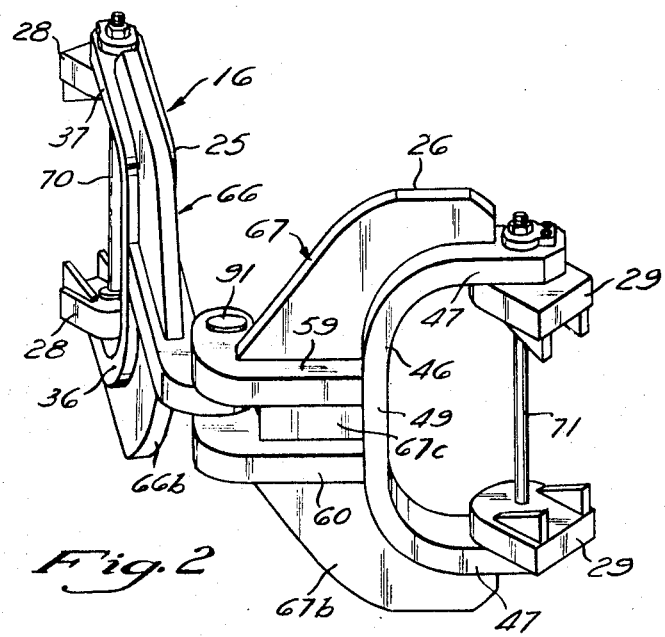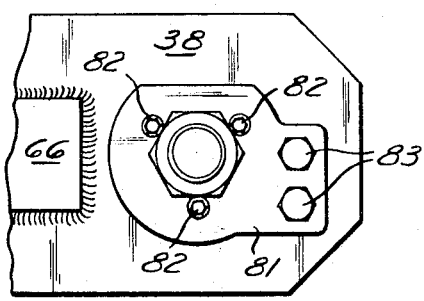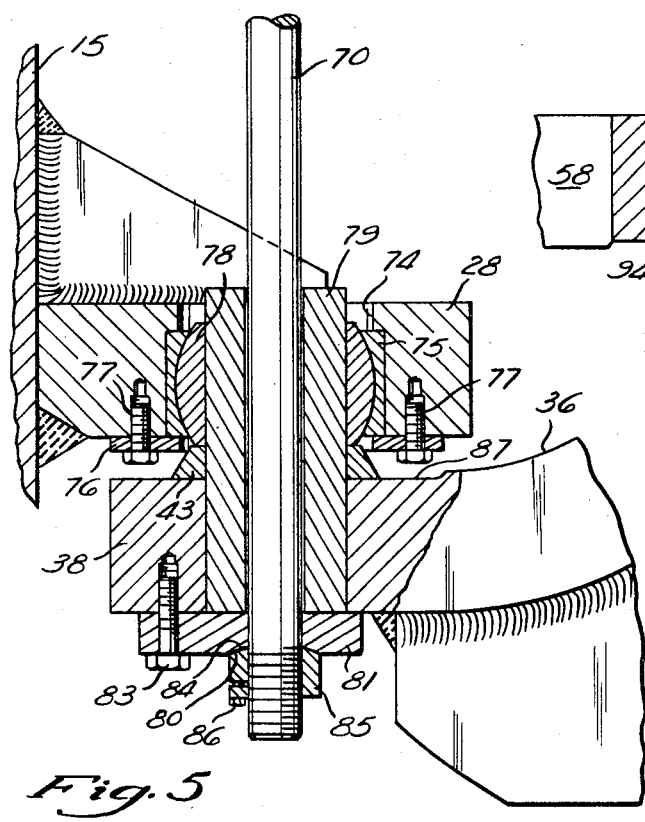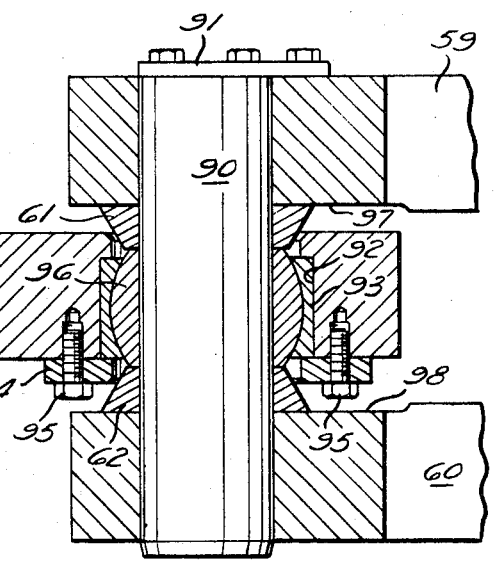

ARTICULATED TORQUE ARM CONSTRUCTION

BACKGROUND OF THE INVENTION

This invention relates generally to torque arms, and more specifically to articulated torque arm units that are particularly adapted to transmit torque from a torque transmitting body to a torque receiving body when there is relative movement therebetween.

Articulated torque arm units generally include a pair of pivotally connected arms for transmitting torque between bodies that may be displaced relative to one another. Such torque arms are used in a variety of applications, including tunneling machines such as disclosed in U.S. Pat. No. 3,383,183 to Scaravilli et al.

Tunneling machines such as disclosed in U.S. Pat. No. 3,383,138 include a support frame anchored in a tunnel bore and a movable frame carried on the support frame by articulated torque arm units. The movable frame may be displaced axially with respect to the support frame, and the articulated torque arm units carry the movable frame and transmit torque from the movable frame to the anchored support frame to prevent rotational movement of the movable frame while permitting axial movement of the movable frame. Each articulated torque arm unit includes a pair of Y-shaped arms having their central branches pivotally connected together at a central arm pivot point. The remaining two branches of one of the torque arms for a yoke and are pivotally connected to flanges on the support frame or torque receiving body at spaced apart and aligned body pivot points. The remaining two branches of the other torque arm also form a yoke and are similarly pivotally connected to flanges on the movable frame or torque transmitting body at spaced apart and aligned body pivot points.

Because there may be relative axial movement between the torque transmitting body and the torque receiving body as torque is transmitted through the articulated torque arm units, it is necessary to provide thrust bearing means at the central pivot point and at each body pivot point. Since the torque that is transmitted may be acting on the torque transmitting arm either in a clockwise direction or in a counterclockwise direction, it is necessary to provide thrust bearing surfaces for receiving the imposed thrust load in both directions. For this purpose, the central pivot point is provided with a thrust bearing means which can receive and transmit thrust in either direction. One body pivot point of each arm is provided with a thrust bearing means which receives and transmits torque in one direction, and the other body pivot point of each arm is provided with a thrust bearing means which receives and transmits torque in the other direction.

When the torque transmitted from the torque transmitting body to the torque receiving body is acting in one direction, the transmitted torque load is taken by the thrust bearing means at the central pivot point and body pivot points which are arranged to receive and transmit the torque load applied in that direction. The torque acting in this one direction may impose sufficient stress in each torque arm to strain each torque arm a significant amount. This strain may separate the thrust bearing surfaces that are arranged to take the torque load in the opposite direction at the central pivot point and at the body pivot points. Then, when the transmitted torque load suddenly decreases, the stress is suddenly decreased or relieved and the separated thrust bearing contact surfaces at the central pivot point and body pivot points which are arranged to receive the torque load in said opposite direction are moved together with a sharp impact.

Since the transmitted torque may increase and then suddenly decrease at the tunneling machine cutter head encounters various materials, this separating and impacting together of the bearing surfaces may occur quite frequently. This substantially reduces the useful life of the thrust bearing surfaces, and necessitates premature replacement thereof with consequent increased maintenance costs on the tunneling machine.

SUMMARY OF THE INVENTION

The present invention overcomes these problems and disadvantages of prior art articulated torque arm units by providing a novel torque arm unit construction and arrangement which resists deflection to prevent separation of the thrust bearing surfaces.

This is accomplished according to the principles of the invention by providing each torque arm with a generally U-shaped yoke member having opposed end portions pivotally connected to the torque transmitting or torque receiving body at body pivot points. Each of these body pivot points is provided with a thrust bearing means for receiving a thrust load in one direction, so that the thrust bearing means in the two end portions cooperate to provide the yoke with thrust bearing means for transmitting torque loads in both the clockwise and the counterclockwise direction. Extending between these two opposed end portions of each U-shaped yoke member is a central yoke portion. This central yoke portion of each torque arm is provided with an ear portion arranged to be pivotally connected to the mating ear portion of its cooperating torque arm.

To prevent separation of the end portions of the yoke member and consequent separation of the thrust bearing surfaces when the torque arm receives and transmits torque loads, the invention provides a generally U-shaped reinforcing member. This reinforcing member is a substantially flat member and is arranged in a plane which is substantially coplanar with that of the U-shaped yoke member. In this manner, the reinforcing member is arranged in such a manner that its greatest section modulus resists deflection of the yoke member. In the preferred embodiment, the reinforcing member is substantially wider near the central portion of the yoke member than near the end portions of the yoke member to still further provide the maximum resistance to deflection of the yoke member when torque loads are transmitted through the unit.

To still further prevent separation of the thrust bearing surfaces at the body pivot points, the invention also provides a prestressing means. According to this aspect of the invention, a rod member operatively interconnects the end portions of the yoke member to one another. This rod is prestressed to bias the thrust bearing surfaces at each body pivot point together to prevent separation thereof, when the arm is subjected to a torque load in a direction opposite to that which the bearing surfaces are arranged to receive. In the preferred embodiment of the invention, this is accomplished by arranging the yoke member such that the portions of the body to which the yoke member is pivotally connected are inside of its end portions. In this manner, the prestressing rod may be arranged in tension to bias the end portions of the yoke member toward one another and toward the portions of the body to which they are pivotally connected.

To still further prolong the life of the thrust bearings at the body pivot points, the invention provides self-aligning ball bushings at each body pivot point. The thrust bearing means at each pivot point is then arranged to act between the yoke end portion and one end face of the ball. In this manner, substantially perfect surface contact alignment between the thrust bearing contact surfaces is assured even in the event the yoke member is deflected in such a manner that the yoke end portion contact surface is not parallel to the portion of the body to which it is pivotally connected.

Premature failure of the thrust bearing surfaces at the central pivot point is prevented according to the principles of the invention by arranging the projecting cooperating ears in such a manner that the central pivot point is as close as possible to the reinforcing member. This insures minimum deflection of the ears even when a relatively high torque load is transmitted therethrough. The invention further provides one of the torque arms with a pair of female ears spaced apart and arranged to receive a male ear of the other torque arm therebetween. Further according to the principles of the invention, the central pivot point is provided with a self-aligning ball bushing and with thrust bearing means acting between the end faces of the ball and the adjacent inside surfaces of the female ears. In this manner, the invention prevents separation of the thrust bearing surfaces at the central pivot point even if the arms are deflected from their positions of proper alignment with respect to one another.

BRIEF DESCRIPTION OF THE DRAWINGS

The foregoing and following further and additional aspects and advantages of the invention will become more readily apparent upon a full understanding of the preferred embodiment of the invention described in detail herein and illustrated in the accompanying drawings, wherein:

FIG. 2 is a perspective view of an articulated torque arm unit according to the preferred embodiment of the invention and used in the tunneling machine shown in FIG. 1;

FIG. 5 is an enlarged fragmentary cross-sectional view of a body pivot point taken on line 5-5 in FIG. 4;

FIG. 6 is an enlarged fragmentary cross-sectional view of the central pivot point taken on line 6-6 in FIG. 4; and FIG. 7 is an enlarged fragmentary elevational view of a typical end portion of the articulated torque arm unit shown in FIG. 2.

DESCRIPTION OF THE PREFERRED EMBODIMENT

Figure 1:
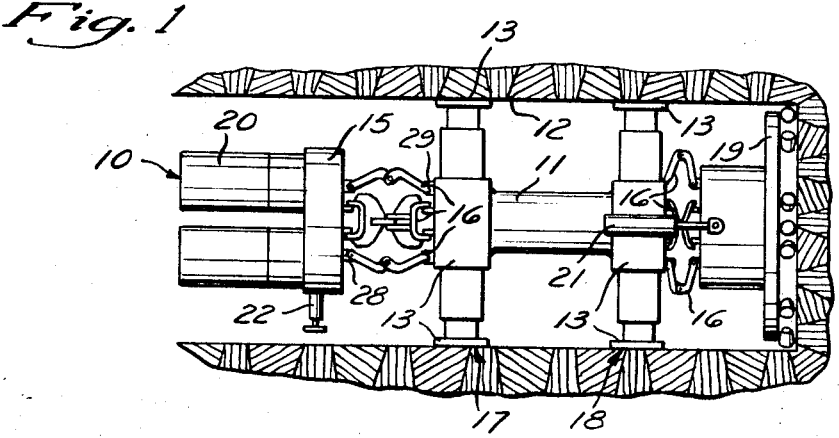
FIG. 1 is a schematic view of a tunneling machine utilizing articulated torque arm units.

Referring now to the drawings in greater detail, FIG. 1 shows a tunneling machine 10 of the type disclosed in U.S. Pat. No. 3,383,138 to Scaravilli et al. The tunneling machine 10 includes a support frame 11 anchored in a tunnel bore 12 by four independently hydraulically actuated support feet 13 (only two of which may be seen in FIG. 1) at each of two axially spaced zones 17 and 18. An elongated movable frame 15 is carried on the support frame 11 by a forward and a rearward set of articulated torque arm units. Both sets include four circumferentially spaced articulated torque arm units 16 (not all of which may be seen in FIG. 1) which cooperate both to position and to support the movable frame 15 with respect to the support frame 11 and to transmit torque between the movable frame and the support frame.

A rotatable cutter head assembly 19 is mounted on the front end of the movable frame 15 and is rotatably driven by an elongated shaft which extends from the cutter head 19 axially rearwardly through the movable frame to a drive motor assembly 20. As the cutter head 19 is rotated by the drive motor assembly 20, push cylinders 21 (only one of which may be seen in FIG. 1) interconnecting the support frame and the movable frame provide the necessary forward thrust to advance the movable frame 15 with the cutter head 19 forwardly with respect to the support frame 15 which is enclosed in the tunnel by the support feet 13. When the movable frame 15 is fully advanced from the rearward position shown in FIG. 1 to a forward position relative to the support frame 11 in which the front set of torque arm units are opened and the rear set of torque arm units are closed, auxiliary support feet 22 are lowered to support the rearward portion of the movable frame 15, the support feet 13 are retracted, and the reversible push cylinders 21 pull the support frame 11 forwardly in the tunnel 12 to prepare the tunneling machine 10 for another boring cycle.

As seen in FIG. 1, the reaction torque to the imposed driving torque on the cutter head 19 is transmitted along the drive shaft to the motor assembly 20, and therefore is taken up primarily by the rearward set of articulated torque arm units. The front set of articulated torque arm units serve primarily to support the cutter head 19 and to absorb shock loads which may result from uneven cutting. It will thus be appreciated that the support frame 11 may be considered a torque receiving body, the movable frame 15 may be considered a torque transmitting body, and the articulated torque arm units 16 serve to transmit torque from the torque transmitting body to the torque receiving body.

Figure 3:
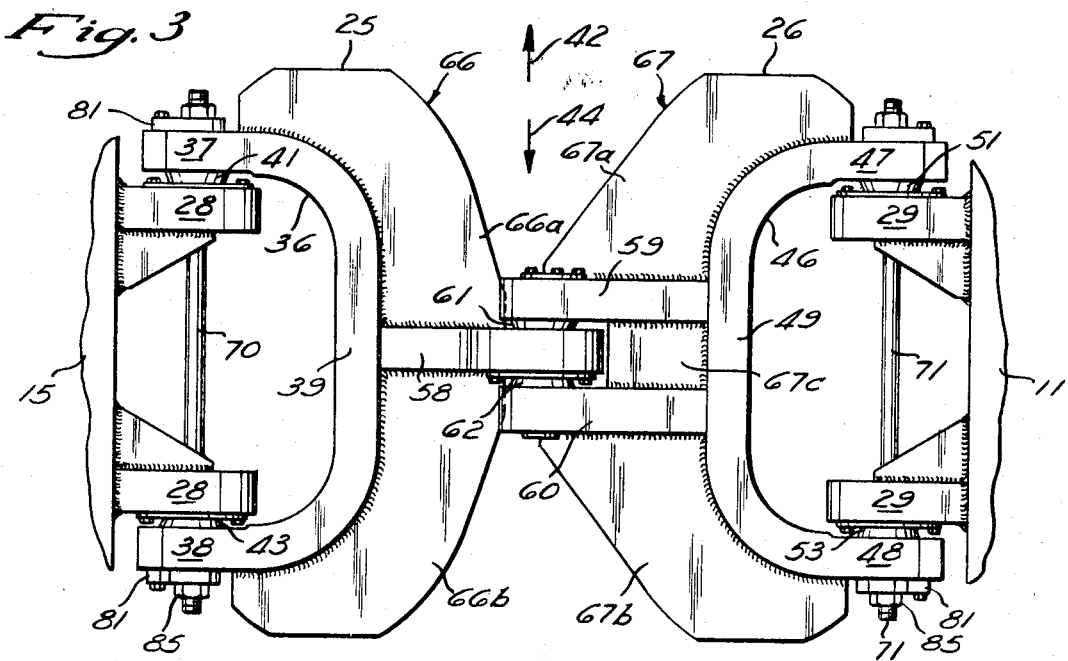
FIG. 3 is a top plan view of the articulated torque arm unit shown in FIG. 2.
Figure 4:
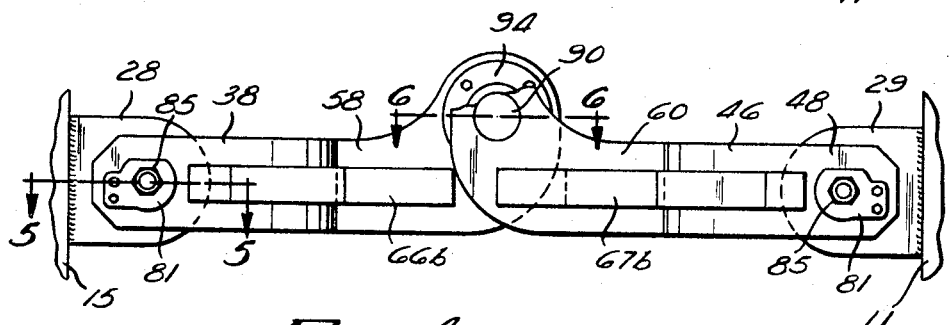
FIG. 4 is a side elevational view of the articulated torque arm unit shown in FIGS. 2 and 3.

As seen in FIGS. 2—4, each articulated torque arm unit 16 includes a male torque arm 25 and a female torque arm 26 pivotally connected together at a central pivot point. The male torque arm 25 and the female torque arm 26 are pivotally secured to flange weldments 28 and 29 respectively at body pivot points. In the preferred embodiment, the flange weldments 28 associated with the male torque arm 25 are welded to the movable frame 15, and the flange weldments 29 associated with the female torque arm 26 are welded to the support frame 11, so that the arm 25 may be considered a torque transmitting arm and the arm 26 may be considered a torque receiving arm. In contradistinction to this preferred arrangement, the arm 26 could be pivotally secured to the movable frame 15 and the arm 25 could be pivotally secured to the support frame 11, since each arm can receive and transmit torque equally well in either direction as will become more readily apparent below.

The general construction and arrangement of each torque arm unit 16 is best shown in FIGS. 2—4. The male torque arm 25 includes a generally U-shaped yoke member 36 having opposed end portions 37 and 38 with a central portion 39 extending therebetween. The end portions 37 and 38 are pivotally connected to the flange weldments 28 at body pivot points. A thrust bearing 41 is interspaced between the end portion 37 and its associated flange weldment to receive and transmit torque loads from the flange weldment 28 of the movable body 15 in a direction indicated by arrow 42. In a similar manner, a thrust bearing 43 is interspaced between the end portion 38 and its associated flange weldment 28 to receive and transmit thrust loads from the flange weldment 28 of the movable body 15 in the direction indicated by arrow 44. The yoke member 36 is preferably hot formed from hot rolled steel, and is arranged in the preferred embodiment such that its greatest section modulus is perpendicular to its pivotal axis and perpendicular to the plane of the U which it forms, to resist twisting moments that may be imposed thereon.

The construction and arrangement of the torque arm 26 is similar to that of the arm 25. The arm 26 includes a yoke member 46 having opposed end portions 47 and 48 with a central portion 49 extending therebetween. A thrust bearing 51 is interspaced between the end portion 47 and its associated flange weldment 29 of the support frame 11 to receive and transmit torque loads from the end portion 47 to the support frame 11 in the direction indicated by the arrow 44. A thrust bearing 53 is interspaced between the end portion 48 and its associated flange weldment 29 of the support frame 11 to receive and transmit torque loads from the end portion 48 in the direction indicated by the arrow 42.

Since torque loads are transmitted in either direction from the arm 25 to the arm 26 at the central pivot point 27, the arm 25 is provided with a single projecting ear portion 58, which is received between two projecting ear portions 59 and 60 of the arm 26. A thrust bearing 61 is provided between the ears 58 and 59 to receive and transmit torque loads from the arm 25 in the direction 42. In a similar manner, a thrust bearing 62 is provided between the ears 58 and 60 to receive and transmit torque loads from the arm 25 to the arm 26 in the direction 44. The structural details of the thrust bearings 41, 43, 51, 61 and 62 will be explained in detail below.

Absent the present invention, if the torque load imposed by the movable frame 15 in the direction 42 were sufficient, the torque arms 25 and 26 could be deflected so that the thrust bearings 43 and 51 were separated from at least one of their thrust contact surfaces. Then, in the event of a sudden decrease or directional reversal of the thrust load, these separated thrust bearing surfaces would be slammed or impacted together. Since the torque load may increase and then suddenly decrease as the tunneling machine cutter head encounters various materials or shock loads, this separating and slamming together of the bearing surfaces may occur quite frequently and substantially reduce the useful life of the thrust bearing contact surfaces.

To overcome this problem, the present invention provides the torque arm 25 with a reinforcing member 66 and provides the torque arm 26 with a reinforcing member 67. Each reinforcing member 66 and 67 is a substantially flat and generally U-shaped member. The members 66 and 67 are arranged in a plane which is substantially coplanar with that of their associated U-shaped yoke members so that the greatest section modulus of each reinforcing member resists deflection of its associated yoke member. In the preferred embodiment, the reinforcing members 66 and 67 are substantially wider near the central portion of their associated yoke members than near the end portions of those yoke members to still further provide the maximum resistance to deflection of the yoke member when torque loads are transmitted through the unit. The reinforcing members 66 and 67 are preferably cut from flat hot rolled steel plate stock. The member 66 is formed in two sections 66a and 66b which are welded to the yoke member 36 and to each side of the ear portion 58. The member 67 is formed in three pieces, 67a, 67b and 67c, two of which, 67a and 67b, are welded to yoke member 46 and to the outer sides of the ear portions 59 and 60, and the other, 67c, of which is welded between the ear portions 59 and 60.

To still further prevent separation of the thrust bearing surfaces arranged to receive and transmit thrust loads in one direction when the torque arm unit is subjected to torque loads acting in the other direction, the invention provides a prestressing means for prestressing the bearing contact surfaces together at each body pivot point. In this manner, the thrust bearing contact surfaces at each body pivot point cannot be separated unless the stress acting to separate the end portions of the arms exceeds the prestress. According to the preferred embodiment of this aspect of the invention, the male torque arm 25 is provided with a rod member 70 which operatively interconnects the end portions 37 and 38 thereof. The rod 70 is prestressed to bias the thrust bearing contact surfaces of the thrust bearings 41 and 43 together to prevent separation thereof when the arm 25 is subjected to a torque load in a direction opposite to that which the bearing surfaces are arranged to receive. In the preferred embodiment, this is accomplished by arranging the yoke member 36 such that the flange weldments 28 of the movable frame 15 are inside the end portions 37 and 38. In this manner, the prestressing rod 70 is arranged in tension to bias the end portions 37 and 38 toward one another and toward the flange weldments 28 of the body 15 to which they are pivotally connected. In a similar manner, the torque arm 26 is provided with a prestressing rod 71 arranged in tension to bias its end portions 47 and 48 toward one another and toward the flange weldments 29 of the support frame 11 to which they are pivotally connected. The structural details and arrangement of the prestressing rods 70 and 71 and of the body pivot points is discussed in detail below.

To still further prevent separation of the thrust bearing contact surfaces when the torque arm unit is subjected to stress, the invention provides self-aligning ball bushing at each body pivot point. The structural details of all of the body pivots points are identical, and those of one of the body pivot points of the arm 25 are shown in detail in FIG. 5. As seen in FIG. 5, the flange weldment 28 is provided with a stepped bore 74 for receiving an outer ring 75. The outer ring 75 is a press fit in the stepped bore 74 and seats against the shoulder formed in the bore. A generally flat annular retainer ring 76 retains the outer ring 75 in its proper position, and is secured in place by bolts 77 circumferentially spaced therearound. The outer ring 75 is split into two semicircular sections (not shown) so that it can receive a ball bushing 78. The ball bushing 78 is push fit on a pivot pin 79 so that relative rotational movement occurs between the ball 78 and the pin 79. The pivot pin 79 is secured to an end plate 81 (FIG. 7) by bolts 82. The end plate 81 is then secured to the end portion 38 of the arm 36 by the bolts 83 so that the pivot pin 79 rotates with the arm 36. The prestressing rod 70 extends through the pivot pin 79, and is threaded at its end to receive a split locking nut 85. The locking nut 85 is provided to stress the rod 70 in tension to bias the end portions 37 and 38 of the arm 25 toward the flange weldments 28 of the body 15 to bias the thrust bearing surfaces at the body pivot points together in the manner described above. To avoid problems of alignment of the rod 70 with respect to plate 81, the nut 85 has a spherical thrust face 84 which engages a spherical socket 80 on the face of plate 81. When the proper amount of prestressing has been achieved by tightening the nut 85 a predetermined number of turns, the bolt 86 is tightened to lock the split nut 85 in place.

As best seen in FIG. 5, the thrust bushing 43 is arranged to act between a machined surface 87 of the yoke end portion 38 and one end face of the ball 78. Since the ball 78 may rotate in any direction within the outer ring 75, this aspect of the invention insures substantially perfect contact alignment between the thrust bushing 43 and its thrust contact surfaces even in the event the arm 25 is deflected in such a manner that the machined surface 87 is not parallel to its associated flange 28.

In this manner, the various aspects of the invention cooperate to provide an articulated torque arm unit in which the thrust bearing contact surfaces at the body pivot points are not separated and impacted together even under severe shock loading conditions. The U-shaped yoke member having opposed end portions pivotally connected to the torque receiving or torque transmitting body permits the use of a reinforcing member which may be arranged in such a manner that its greatest section modulus prevents separation of the yoke end portions. The prestressing rod then acts in a manner to simply bias the end portions of the yoke together to prevent separation thereof. Still further, the self-aligning ball bushings provide alignment of the thrust bushing contact surfaces even if the yoke member is distorted.

The present invention still further provides a means for preventing the above-described separation and the slamming together of the thrust bearing contact surfaces at the central pivot point. According to this aspect of the invention, the projecting ear portions 58, 59, and 60 are arranged in such a manner that the central pivot point is as close as possible to the reinforcing members 66 and 67. This arrangement substantially prevents deflection of the ear portions even when a relatively high torque load is transmitted therethrough. Although this aspect of the invention prevents separation of the ear portions, deflection of other portions of the arms 25 and 26, or even deflection of the bodies 11 and 15 themselves, could produce misalignment of the thrust bearing contact surfaces at the central pivot point. For this purpose, the invention further provides a self-aligning ball bushing at the central pivot point.

Referring now to FIG. 6, a solid pivot pin 90 extends through the ear portions and is rigidly secured to the ear portion 59 by the end plate 91. A stepped bore 92 in the ear 58 is provided to receive an outer ring 93. The outer ring 93 is press fit into the stepped bore 92 so that it seats against the shoulder formed in the bore 92. The outer ring 93 is held in place by the substantially flat annular retainer ring 94, which is secured to the ear 59 by circumferentially spaced bolts 95. The outer ring 93 is split into two semicircular halves, so that it may receive a ball bushing 96. The ball bushing 96 is then tight press fit on the pivot pin 90 to prevent relative rotational movement therebetween. The thrust bushing 61 is arranged on the pivot pin 90 to act between a machined contact surface 97 of the ear 59 and one end face of the ball bushing 96. In a similar manner, the thrust bushing 62 is arranged on the pivot pin 90 to act between the machined contact surface 98 of the ear 60 and the other end face of the ball bushing 96. In the preferred embodiment, the thrust bushings 61 and 62 are arranged to provide a zero tolerance fit between the thrust bearing contact surfaces. In this manner, separation of the thrust bearing contact surfaces at the central pivot point is prevented even if the ear portions are not properly aligned due to deflection.

Although a preferred embodiment of the invention has been shown and described in detail, this has been done for purposes of example only, and various modifications and rearrangements may be made without departing from the scope of the invention.

What we claim is:

1. A torque arm unit comprising a first arm and a second arm pivotally connected to said first arm at a central pivot point, said first arm including a yoke portion having two opposed end portions pivotally connected to a torque transmitting body at body pivot points, said second arm including a yoke portion having two opposed end portions pivotally connected to a torque receiving body at body pivot points, each of said body pivot points including a thrust bearing means which has thrust bearing contact surfaces and which is arranged to receive and transmit thrust loads in at least one direction, and said first and second arms each including a prestressing means biasing said thrust bearing contact surfaces of said thrust bearing means together to prevent separation of the thrust bearing contact surfaces arranged to receive and transmit thrust loads in one direction when the thrust load is imposed in the opposite direction.

2. A torque arm unit as defined in claim 1, wherein said prestressing means includes a stressed rod member extending between said end portions of said yoke portion.

3. A torque arm unit as defined in claim 1, wherein said thrust bearing contact surfaces of each of said body pivot points includes a radial end face of a self-aligning ball bushing.

4. A torque arm unit as defined in claim 3, wherein said central pivot point includes a thrust bearing means which has thrust bearing contact surfaces and which is arranged to receive and transmit thrust loads in at least one direction, said thrust bearing contact surfaces including a radial end face of a self-aligning ball bushing.

5. A torque arm unit as defined in claim 1, wherein said yoke portion of each arm is a U-shaped member, and each arm includes a substantially U-shaped reinforcing member welded to said yoke portion, said reinforcing member being substantially coplanar with said yoke member to resist deflection of said end portions.

6. A torque arm unit comprising a first arm and a second arm pivotally connected to said first arm at a central pivot point, said first arm including a portion pivotally connected to a torque transmitting body, said second arm including a portion pivotally connected to a torque receiving body, said central pivot point including a thrust bearing means which has thrust bearing contact surfaces and which is arranged to receive and transmit loads in one direction, said thrust bearing contact surfaces including a radial end face of a self-aligning ball bushing.

7. A torque arm unit comprising a first arm and a second arm pivotally connected to said first arm at a central pivot point said first arm including a yoke portion having two opposed end portions each of which is pivotally connected to a torque transmitting body at body pivot points, said second arm including a yoke portion having two opposed end portions each of which is pivotally connected to a torque receiving body at body pivot points, one of the body pivot points of said first arm and one of the body pivot points of said second arm including thrust bearing means arranged to receive and transmit thrust loads in a first direction, the other body pivot points of said first and second arms including thrust bearing means arranged to receive and transmit thrust loads in a second direction opposite said first direction, each of said body pivot points including a self-aligning ball bushing to permit relative rotational movement of said arms at said body pivot points, and one end face of each of said ball bushings being a contact surface of said thrust bearing means.

8. A torque arm unit comprising a first arm and a second arm, said arms being pivotally connected to each other by a bearing at a central pivot point, said arms each including a U-shaped yoke portion having opposed end portions, the two opposed end portions of said first arm each being pivotally connected to a torque transmitting body at a body pivot point, the two opposed end portions of said second arm each being pivotally connected to a torque receiving body at a body pivot point, one of the body pivot points of said first arm and one of the body pivot points of said second arm including thrust bearing means arranged to receive and transmit thrust loads in a first direction, the other body pivot points of said first and second arms including thrust bearing means arranged to receive and transmit thrust loads in a second direction opposite said first direction, and a substantially flat U-shaped reinforcing portion adjacent each of said yoke portions, each of said reinforcing portions being substantially flat and being substantially coplanar with a plane defined by the central pivot point and the body pivot points of its associated yoke portion to resist separation of the bearing contact surfaces of the thrust bearing means arranged to receive and transmit thrust loads in one direction when the thrust load is in a direction opposite said one direction.

9. A torque arm unit as set forth in claim 8, wherein one of said arms includes bearing support means adjacent said central pivot point comprising two spaced-apart and substantially flat projecting ear potions extending from the yoke portion of said one arm and arranged in a plane substantially perpendicular to the plane of the reinforcing portion of said one arm, and said reinforcing portion of said one arm includes three sections, one of said sections interspaces said two projecting ears and is adjacent a surface of each ear, another of said sections is adjacent the other surface of one of said ears, and the other of said sections is adjacent the other surface of the other of said ears.

10. A torque arm unit as set forth in claim 9, wherein the other of said arms includes bearing support means adjacent said central pivot point comprising a substantially flat projecting ear portion extending from the yoke portion of said other arm and arranged in a plane substantially perpendicular to the plane of the reinforcing portion of said other arm, said ear portion of said other arm is received within the space between said ear portions of said one arm, and said reinforcing portion of said other arm includes two sections, one of said sections is adjacent one surface of said ear portion of said other arm, and the other of said sections is adjacent the other surface of said ear portion of said other arm.

11. A tunneling machine comprising a support frame and a movable frame carried on said support frame by a plurality of articulated torque arm units, each of said units including a first arm and a second arm pivotally connected to said first arm at a central pivot point, said first arm including a yoke portion having two opposed end portions pivotally connected to a torque transmitting body at body pivot points, said second arm including a yoke portion having two opposed end portions pivotally connected to a torque receiving body at body pivot points, each of said body pivot points including a thrust bearing means which has thrust bearing contact surfaces and which is arranged to receive and transmit thrust loads in at least one direction, and said first and second arms each including a prestressing means biasing said thrust bearing contact surfaces of said thrust bearing means together to prevent separation of the thrust bearing contact surfaces arranged to receive and transmit thrust loads in one direction when the thrust load is imposed in the opposite direction.

12. A tunneling machine as defined in claim 11, wherein said prestressing means includes a stressed rod member operatively interconnecting said end portions of said yoke portion.

PO-1050
(5/69)

UNITED STATES PATENT OFFICE
CERTIFICATE OF CORRECTION

Patent No. 3,584,918               Dated June 15, 1971

Inventor(s) Alfonso T. Gaglione et al

It is certified that error appears in the above-identified patent and that said Letters Patent are hereby corrected as shown below:

Col. 1, line 15, "U. S. Patent No. 3,383,183" should be --U. S. Patent No. 3,383,138--.

Col. 1, lines 27,28, "central arm pivot point" should be --central torque arm pivot point--.

Col. 1, line 29, "for" should be --form--

Col. 1, line 43, "hearing" should be --bearing--

Col. 8, line 27, "potions" should be --portions--

Signed and sealed this 21st day of December 1971.

(SEAL)
Attest:

EDWARD M. FLETCHER, JR.
Attesting Officer

ROBERT GOTTSCHALK
Acting Commissioner of Patents